(12) United States Patent
Browne et al.

(10) Patent No.: US 10,725,061 B2
(45) Date of Patent: Jul. 28, 2020

(54) MODULATED AIR SURFACE PARTICLE DETECTOR

(71) Applicant: Pentagon Technologies Group, Inc., Hayward, CA (US)

(72) Inventors: David Browne, Pleasanton, CA (US); Don Lutz, Peoria, AZ (US); William W. Alston, San Jose, CA (US)

(73) Assignee: PENTAGON TECHNOLOGIES GROUP, INC., Hayward, CA (US)

( * ) Notice: Subject to any disclaimer, the term of this patent is extended or adjusted under 35 U.S.C. 154(b) by 212 days.

(21) Appl. No.: 15/872,803

(22) Filed: Jan. 16, 2018

(65) Prior Publication Data

US 2018/0224475 A1    Aug. 9, 2018

Related U.S. Application Data

(60) Provisional application No. 62/454,649, filed on Feb. 3, 2017.

(51) Int. Cl.
| | |
|---|---|
| *G01N 35/00* | (2006.01) |
| *G01N 1/22* | (2006.01) |
| *G01N 15/02* | (2006.01) |
| *G01N 15/06* | (2006.01) |
| *G01N 1/02* | (2006.01) |
| *G01N 1/00* | (2006.01) |
| G01N 15/00 | (2006.01) |

(52) U.S. Cl.
CPC ......... *G01N 35/00732* (2013.01); *G01N 1/00* (2013.01); *G01N 1/02* (2013.01); *G01N 1/22* (2013.01); *G01N 1/2205* (2013.01); *G01N 15/0205* (2013.01); *G01N 15/06* (2013.01); *G01N 15/0612* (2013.01); *G01N 2001/028* (2013.01); *G01N 2015/0019* (2013.01)

(58) Field of Classification Search
CPC ............. G01N 35/00732; G01N 15/06; G01N 15/0612; G01N 15/0205; G01N 1/00; G01N 1/22; G01N 1/02; G01N 1/2205; G01N 2015/0019; G01N 2001/028
USPC ................... 73/864.71, 861.41, 29.05, 31.05
See application file for complete search history.

(56) References Cited

U.S. PATENT DOCUMENTS

| | | | |
|---|---|---|---|
| 4,746,215 | A | 5/1988 | Gross |
| 5,253,538 | A | 10/1993 | Swick |
| 7,010,991 | B2 | 3/2006 | Lutz et al. |
| 2006/0263925 | A1 | 11/2006 | Chandler |
| 2009/0250382 | A1 | 10/2009 | Moore et al. |

(Continued)

FOREIGN PATENT DOCUMENTS

| | | |
|---|---|---|
| JP | 64-500060 | 12/1989 |
| JP | 10-185795 | 7/1998 |
| JP | 11-083694 | 3/2011 |

*Primary Examiner* — Suman K Nath
(74) *Attorney, Agent, or Firm* — DLA Piper LLP (US)

(57) ABSTRACT

A device for counting particles on a sample surface includes a scanner probe having a first opening for receiving particles from a sample surface and one or more second openings, a particle detector for detecting particles passed there-through, a modulator for modulating air flowing there-through, a pump for producing a first airstream flowing from the first opening and through the particle detector, and for producing a second airstream flowing through the modulator and to the one or more second openings, and control circuitry for controlling the modulator to modulate an amplitude of the second airstream.

17 Claims, 14 Drawing Sheets

(56) References Cited

U.S. PATENT DOCUMENTS

| | | |
|---|---|---|
| 2011/0048143 A1 | 3/2011 | Favre et al. |
| 2011/0186436 A1* | 8/2011 | Novosselov ........... B01D 15/08 204/600 |
| 2012/0222495 A1 | 9/2012 | Bates |
| 2013/0133655 A1* | 5/2013 | Kimm ............... A61M 16/0057 128/204.23 |
| 2013/0213115 A1* | 8/2013 | Chu ................... G01N 15/0255 73/28.04 |

* cited by examiner

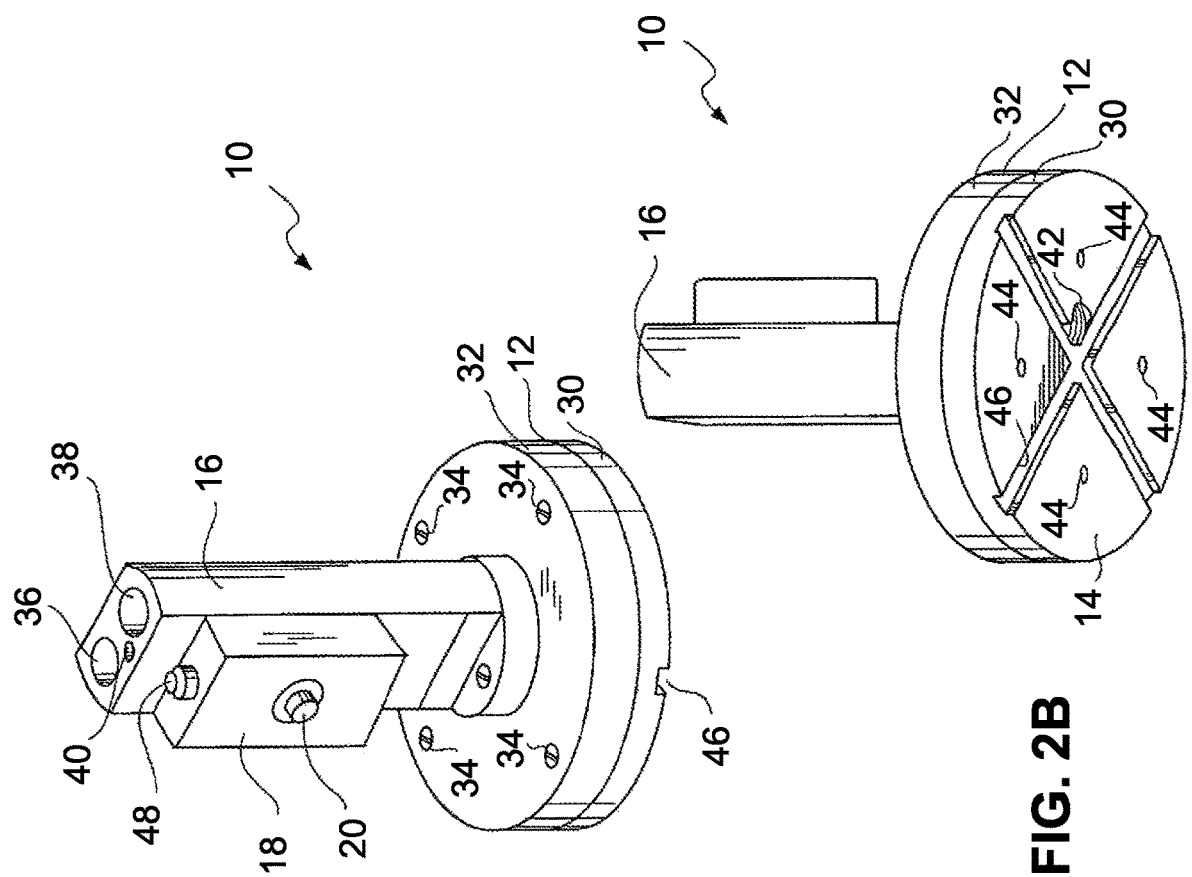

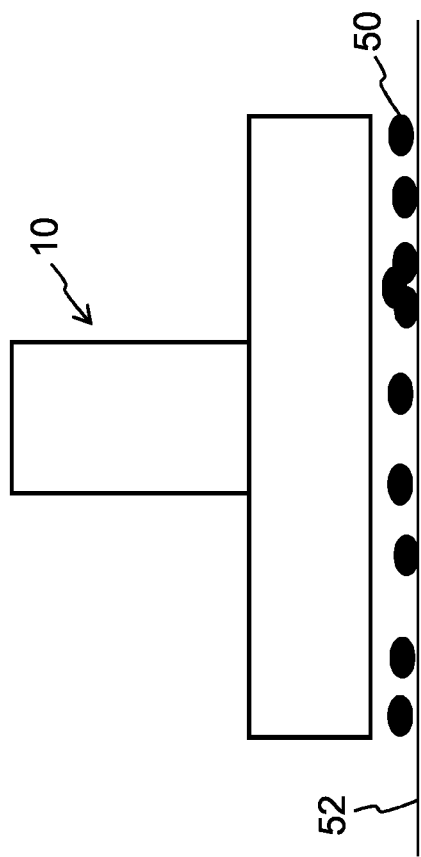
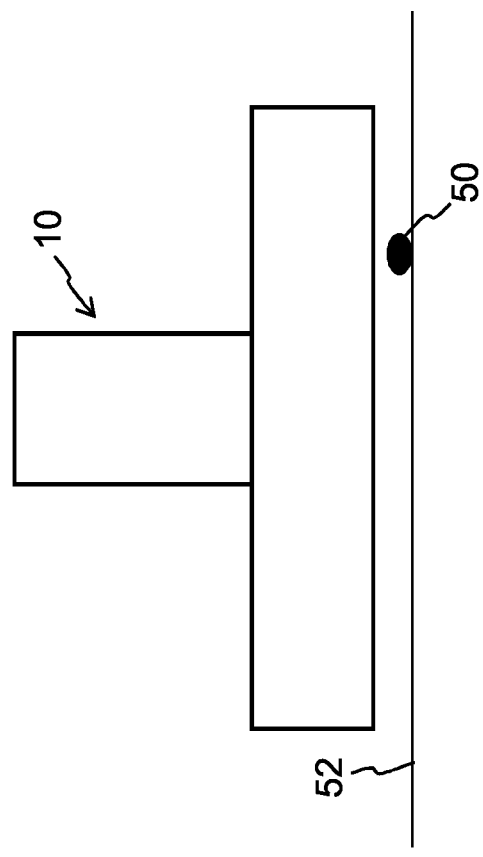

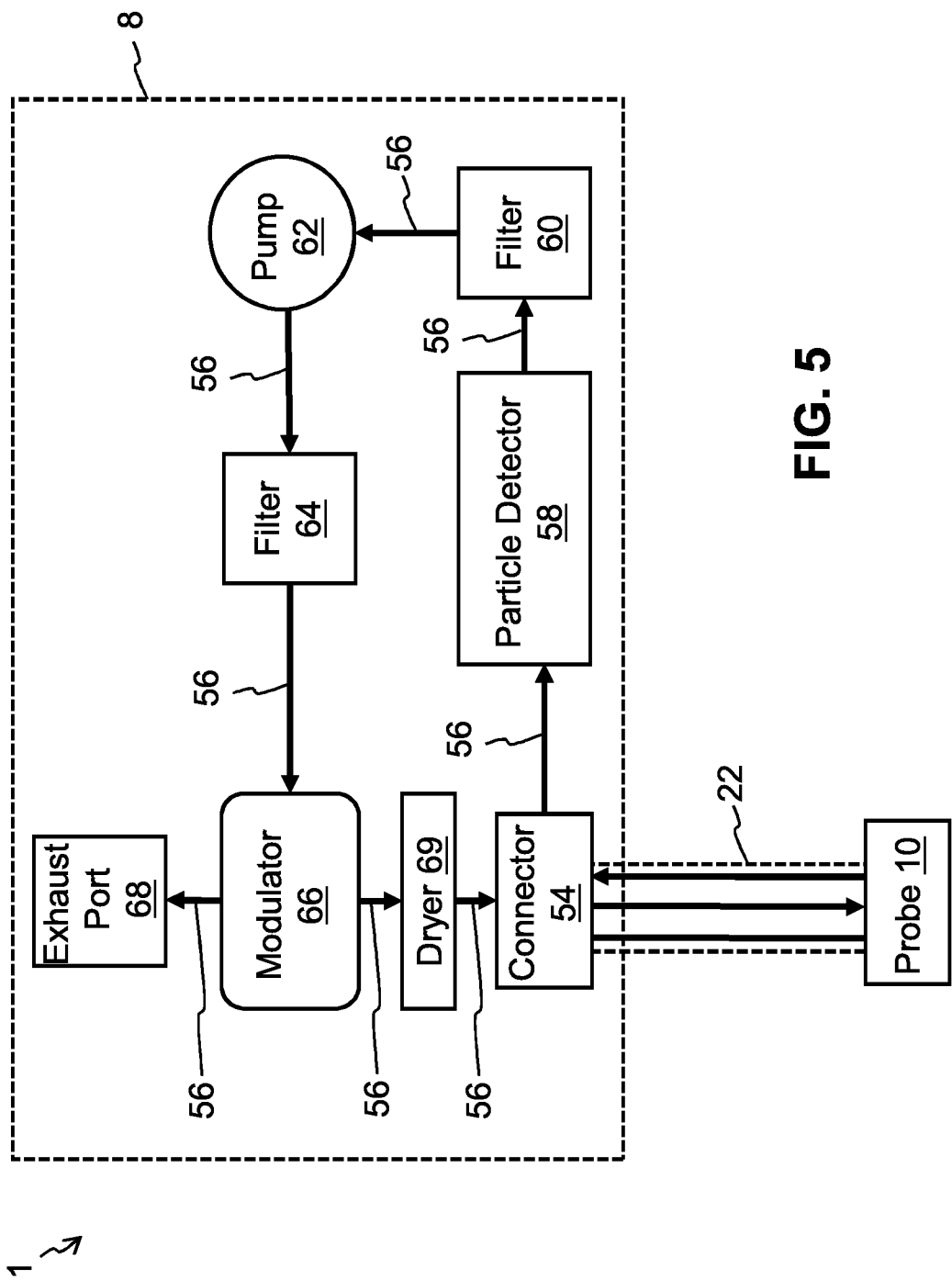

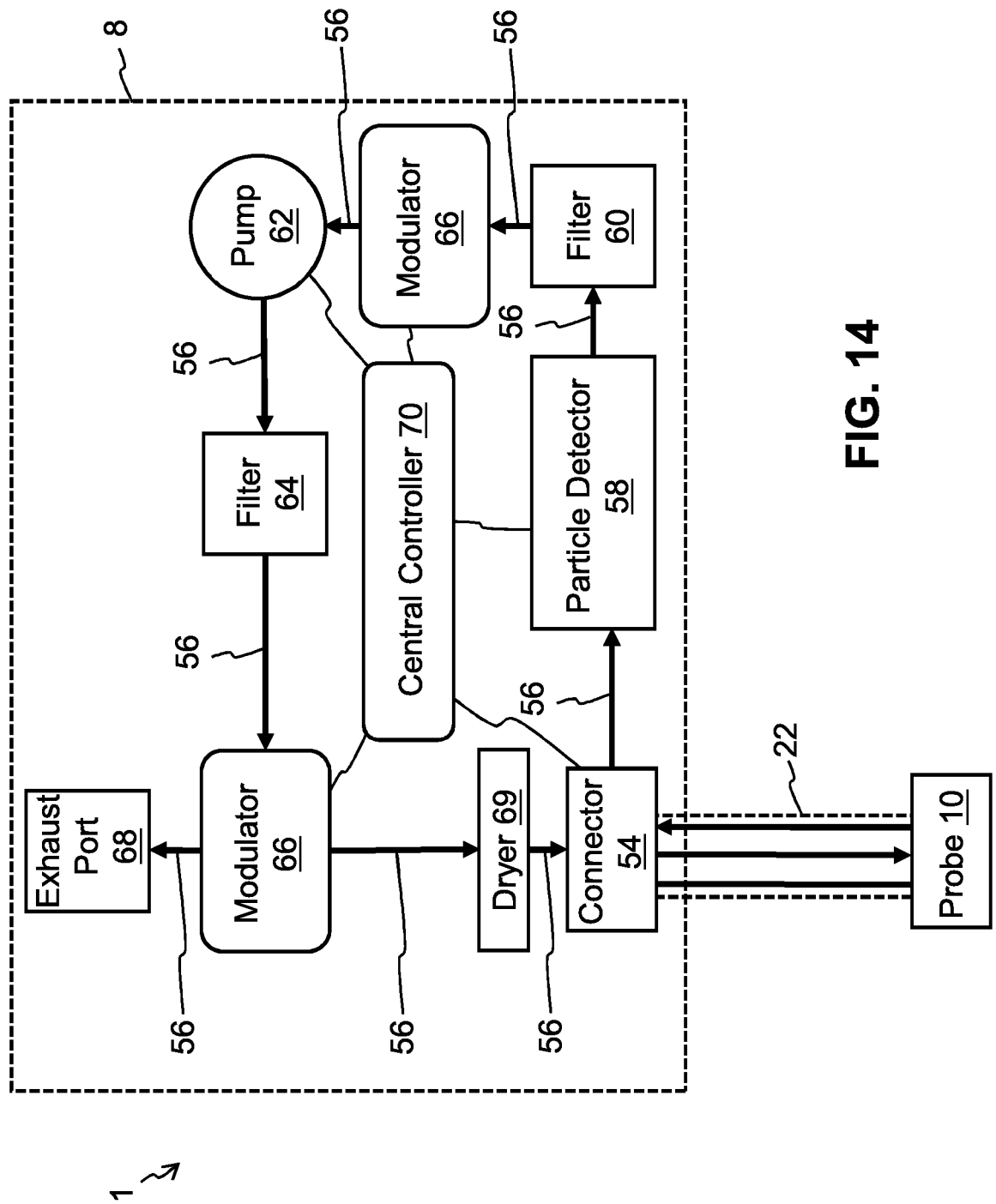

MODULATED AIR SURFACE PARTICLE DETECTOR

RELATED APPLICATIONS

This application claims the benefit of U.S. Provisional Application No. 62/454,649, filed Feb. 3, 2017, and which is incorporated herein by reference.

FIELD OF THE INVENTION

The present invention relates generally to particle counting for clean room applications, and relates more particularly to an improved device for moving particles off of a surface and into a particle counter for the purpose of ascertaining contamination levels.

BACKGROUND OF THE INVENTION

Contamination detection and quantification requirements have become increasingly important, particularly with the rapid evolution of high-tech industries. For example, the semiconductor industry has developed technology for precisely producing microelectronic devices. In order to reliably produce such products, highly stringent contamination standards must be maintained in the production facilities.

In an effort to control and minimize contamination in crucial stages of a production process, "cleanrooms" are frequently used. A cleanroom is a room in which the air filtration, air distribution, utilities, materials of construction, equipment, and operating procedures are specified and regulated to control airborne particle concentrations to meet appropriate airborne particulate cleanliness classifications.

It is important to monitor the cleanliness/contamination levels in a cleanroom, especially for detecting particles on a cleanroom surface. Visual inspection techniques have been used with ultraviolet or oblique white light. Ultraviolet light is employed to take advantage of the fact that certain organic particles fluoresce. Alternatively, white light is shined towards the test surface at an angle so as to produce reflections that can be visualized. While the white light technique is slightly more sensitive than the ultraviolet technique, they both suffer from the same limitations. These visual inspection techniques only allow a cursory inspection of the surface conditions. They do not provide quantitative data. Also, the visual inspection techniques, at best, only detect particles that are larger than twenty microns. It is often desirable to detect particles that are less than one micron.

Another inspection technique involves removing particles from a test surface, by for example, applying a piece of adhesive tape to the test surface. The particles on the tape are then manually quantified by putting the tape under a microscope and visually counting the particles. This technique allows the detection of particles of approximately five microns or larger. The primary disadvantage of this technique is that it is very time consuming, and that it is highly sensitive to variability between operators.

A third inspection technique is disclosed in U.S. Pat. No. 5,253,538. The '538 patent discloses a device that includes a scanner probe having at least one opening for receiving particles from the sample surface. The scanner probe is connected to a tube having first and second ends. The first end of the tube is connected to the scanner probe and the second end of the tube is connected to a particle counter that employs optical laser technology. The particle counter includes a vacuum generator that causes air to flow from the sample surface through the scanner probe, through the tube and into the particle counter, where particles contained in the air stream are counted. The '538 patent discloses an inspection method that involves the use of the particle counting device. A background particle level of zero is first established by holding the scanner probe near the cleanroom supply air and taking repeated readings, or by installing an optional zero-count filter in the particle counter. Next, the hand-held scanner probe is passed over the sample surface at a constant rate for a predetermined test period. The test cycle is started by pushing the run switch, which is located on the scanner probe. The particle counter counts and reads out a number corresponding to the average number of particles per unit area. The process is usually repeated several times along adjacent surface areas, each time yielding a "test reading".

An improvement of the technique disclosed in the '538 patent is one disclosed in U.S. Pat. No. 7,010,991, which is incorporated herein by reference for all purposes. The '991 patent describes a device for counting particles on a sample surface. The device includes a scanner probe having at least one opening for receiving particles from a sample surface, a particle counter for counting particles passed there-through, a conduit having a first end connected to the scanner probe and a second end connected to the particle counter, wherein the conduit includes first and second tubes, a sensor and a controller. The particle counter includes a pump for producing an airstream flowing from the scanner probe opening, through the first tube, through the particle counter, and back to the scanner probe via the second tube, for carrying the particles to the particle counter for quantitation and delivering an airstream flowing back to the scanner probe. The sensor measures a rate of flow of the airstream. The controller controls a speed of the pump in response to the measured rate of flow of the airstream to maintain the airstream at a constant flow rate while the particle counter quantitates the particles in the airstream.

The '991 patent further describes a device including a scanner probe having at least one opening for receiving particles from a sample surface, a conduit having a first end connected to the scanner probe and a second end terminating in a first connector, wherein the conduit includes first and second tubes; a particle counter, electronic indicia, and a controller. The particle counter counts particles passed there-through, and includes a port for receiving the first connector and a pump for producing an airstream flowing from the scanner probe opening, through the first tube, through the particle counter, and back to the scanner probe via the second tube, for carrying the particles to the particle counter for quantitation and delivering an airstream flowing back to the scanner probe. The electronic indicia is disposed in at least one of the first connector, the conduit and the scanner probe for identifying at least one characteristic of the scanner probe. The controller detects the electronic indicia via the port and first connector, and controls the particle counter in response to the detected electronic indicia.

The '991 patent further describes a device including a scanner probe having at least one opening for receiving particles from a sample surface, a particle counter for analyzing particles passed there-through, and a conduit having a first end connected to the scanner probe and a second end connected to the particle counter. The conduit includes first and second tubes. The particle counter includes a pump for producing an airstream flowing from the scanner probe opening, through the first tube, through the particle counter, and back to the scanner probe via the second tube, for carrying the particles to the particle counter and delivering an airstream flowing back to the scanner probe. The particle counter also includes a particle detector for counting the particles in the airstream coming from the scanner probe, a filter cartridge port through which the airstream flows after passing through the particle detector, and a filter cartridge removably connected to the filter cartridge port for capturing the particles in the airstream after being counted by the particle detector.

The efficiency of the above described particle counting devices can be classified as the number of particles extracted from the sample surface and captured/counted by the device, divided by the total number of particles on the sample surface. In order for a particle to be extracted, the air flow across the sample surface created by the scanner probe must be sufficient to overcome the adhesion force between the particle and the sample surface. One known problem of conventional scanner probes, however, is that as the airflow rate of the airstream is increased to attempt to better overcome the adhesion forces of more particles, more of the dislodged particles can be blown away from the scanner probe in which case they are never captured and counted by the device. This problem is called particle ejection, where particles dislodged by the scanner probe are ejected from the area under the scanner probe, where the particles cannot be captured and detected. Thus, merely increasing the velocity of airstream into the scanner probe can result in lower efficiency due to particle ejection, and therefore scanner probe efficiency cannot be fully maximized simply by increasing the velocity of the airstream. Because of particle ejection, there is a limit to the efficiency of these devices.

BRIEF SUMMARY OF THE INVENTION

The aforementioned problems and needs are addressed by a device for counting particles on a sample surface that includes a scanner probe having a first opening for receiving particles from a sample surface and one or more second openings, a particle detector for detecting particles passed there-through, a modulator for modulating air flowing there-through, a pump for producing a first airstream flowing from the first opening and through the particle detector, and for producing a second airstream flowing through the modulator and to the one or more second openings, and control circuitry for controlling the modulator to modulate an amplitude of the second airstream.

A device for counting particles on a sample surface includes a scanner probe having a first opening for receiving particles from a sample surface and one or more second openings, a particle detector for detecting particles passed there-through, a modulator for modulating air flowing there-through, a pump for producing a first airstream flowing from the first opening and through the particle detector and through the modulator, and for producing a second airstream flowing to the one or more second openings, and control circuitry for controlling the modulator to modulate an amplitude of the first airstream.

Other objects and features of the present invention will become apparent by a review of the specification, claims and appended figures.

BRIEF DESCRIPTION OF THE DRAWINGS

FIG. 2A is a top perspective view of the scanner probe.

FIG. 2B is a bottom perspective view of the scanner probe.

FIG. 4A is a side cross sectional view of the scanner probe and testing surface before particle detection.

FIG. 4B is a side cross sectional view of the scanner probe and testing surface after particle detection using modulated air flow.

FIG. 5 is a block schematic diagram of the particle counter assembly and the scanner probe.

FIG. 14 is a block schematic diagram of the particle counter assembly and the scanner probe.

DETAILED DESCRIPTION OF THE INVENTION

Figure 1:
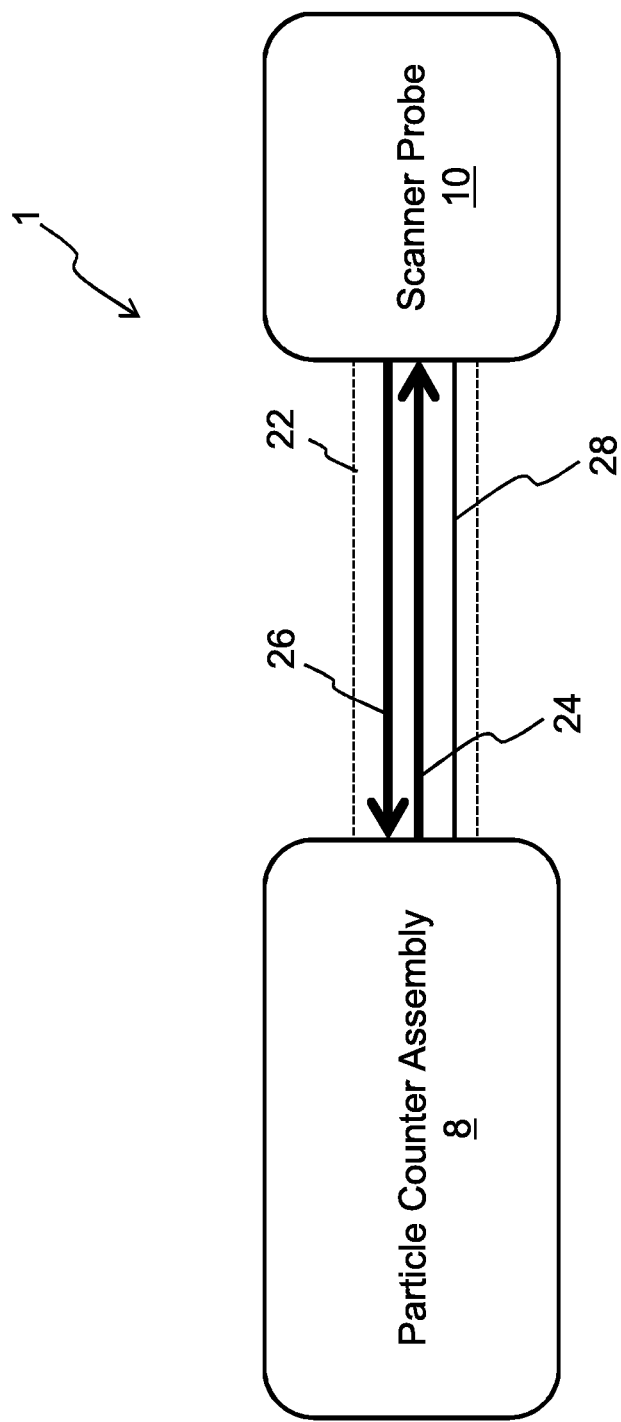
FIG. 1 is a diagram illustrating the particle counter assembly.
Figure 3A:
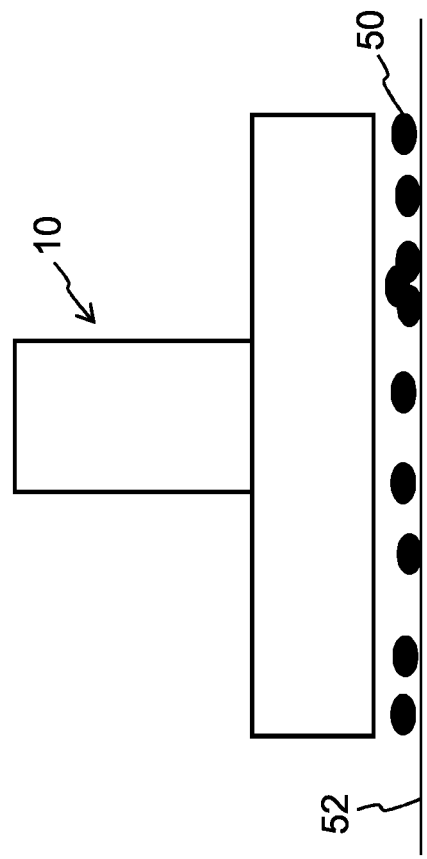
FIG. 3A is a side cross sectional view of the scanner probe and testing surface before particle detection.
Figure 3B:
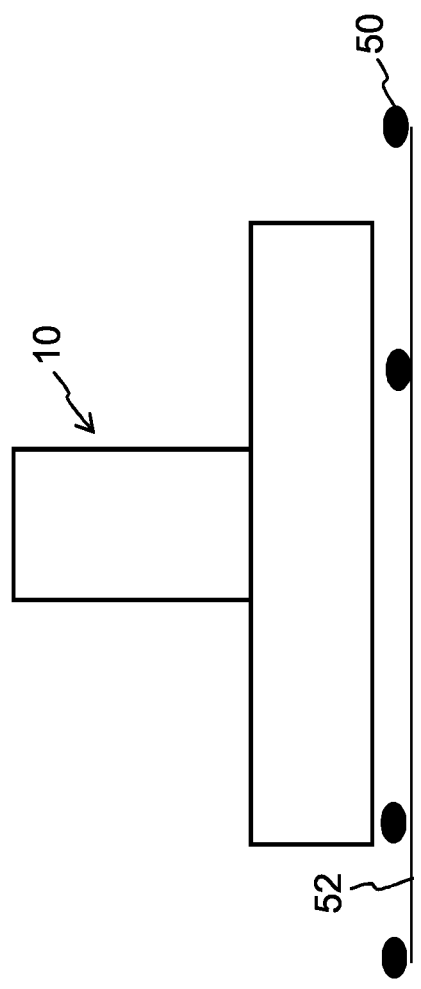
FIG. 3B is a side cross sectional view of the scanner probe and testing surface after particle detection using unmodulated air flow.

The present invention is an improvement over the previously described scanner probe devices. It has been discovered by the present inventors that modulating the air flow rate into the scanner probe results in greater peak air velocities across the tested surface to dislodge more of the particles, yet also results in less particles that are lost by being blow out of and away from the scanner probe (i.e. lower particle ejection). It has also been discovered that the frequency of the air flow modulation affects the efficiency of the system. The frequency is preferably selected to maximize surface shear for particle displacement, to avoid (preferably exceed) the natural resonant frequency of scanner probe face to avoid particle generation by the scanner probe face, and to maximize particle dislodgement off the probed surface (also called "re-suspension") by resonating the particles off of the surface (i.e., use an air flow frequency near or at the natural frequency of the particle). The modulated airstream has been found to effectively rock or stimulate particles off of rough surfaces.

The present invention improves Particle Efficiency PE (which is equal to the particles picked up and delivered to the detector divided by the total particles at the beginning of the test on the surface under the scanner probe head). For example if there are 10 particles on the surface under the scanner probe, and normally 6 particles are picked up and transported in the vacuum line to the detector using a constant flow rate, then the Particle Efficiency PE is 60%. With the modulated air surface particle detector, with the 10 particles under the probe head, particle ejection is minimized, meaning that an additional particle is captured instead of being ejected, and two more additional particles are dislodged and captured instead of staying on the probed surface, Particle Efficiency PE is increased to 9 out of 10 particles, or 90%. Modulating the air flow achieves both decreased ejection and increased energy to break the adhesion force for certain particles that would not overcome their adhesion force with constant air flow. The increased energy is accomplished through increasing air shear that can increase aerodynamic drag, which excites the particle to move by vibrating the particle close to its resonance frequency, and/or increasing the turbulence of the air flow over the particle to increase the changes of resuspension. Thus, Particle Efficiency is improved by modulating the air flowing to the scanner probe, and thus across the scanner probe head, to resonate or disturb the particles and overcome the adhesion force of the particle on the surface so it can be removed.

FIG. 1 shows the primary components of the particle detector 1 for analyzing particles on a sample surface. The main detector components include a particle counter assembly 8, a scanner probe 10, and conduit 22 connected between the particle counter assembly 8 and probe 10.

FIGS. 2A and 2B illustrate the scanner probe 10, which includes a substantially planar base 12. The scanner base 12 has a bottom side 14 for interfacing with the sample surface. The scanner base 12 is perpendicularly connected to a scanner handle 16 which includes a control section 18 having run switch 20 for activating the particle detector and an LED light 48 indicating that particle counting is in progress. The conduit 22 includes a pair of tubes 24 and 26 (supply and return hoses, respectively) each having a first and a second end. The first ends of the tubes 24/26 are connected to the scanner handle 16, and the second ends are connected to a port or connector in the particle counter assembly 8. The conduit 22 also includes electrical wiring 28 which electrically connects the scanner probe 10 to the particle counter assembly 8.

The base portion 12 of the scanner probe 10 has two coin-shaped portions 30 and 32 which are fastened together by screws 34. The scanner embodiment shown in FIGS. 2A and 2B is designed primarily for picking up particles off of a substantially flat surface. However, scanners of other shapes which are specifically designed to conform to non-flat sample surfaces could also be used. Coin-shaped portion 30 of the scanner base 12 is also referred to as a face plate, and is preferably made of a material which is impregnated with a friction limiting non-particulating substance, for example, hard black anodized aluminum with Teflon impregnation, type 3, class 2, mil spec A8625D. The scanner handle 16 has two bores 36 and 38 for receiving the supply and return tubes 24/26. Another hole 40 is provided in the handle 16 for receiving the electrical wiring 28 from the conduit 22.

The scanner base bottom side 14 is designed to interface with the sample surface. In this embodiment, the bottom side 14 has a hole 42 (i.e., a first opening) which is located approximately in the center of the base plate bottom side 14. The hole 42 is connected to the bore 36 in the scanner handle 16 which is connected to the return tube 26 of conduit 22. Particles from the sample surface are sucked through the face plate hole 42 for the purpose of counting the particles in the particle counter assembly 8. The base plate bottom side 14 also has a plurality of smaller holes 44 (i.e., second openings) which converge into the scanner handle bore 38, which is connected to the air supply tube 24 of conduit 22. Air is supplied from the particle counter assembly 8 and delivered through the face plate holes 44 onto the sample surface for dislodging and fluidizing particles so that they may be sucked through face plate hole 42 for counting. Face plate bottom side 14 also has intersecting grooves 46 for channeling dislodged particles into face plate hole 42.

FIGS. 3A-3B and 4A-4B illustrate the increased Particle Efficiency of the modulated air system versus a constant amplitude air system of the particle detector 1. FIG. 3A illustrates ten particles 50 disposed under the scanner probe 10 on a surface 52 to be tested. FIG. 3B illustrates the state of the surface 52 after the use of constant air flow supplied to the scanner probe 10 to extract and detect the particles. Of the original ten particles, two particles remain under the scanner probe 10 as un-extracted particles, and two particles are dislodged from the area under the scanner probe 10 as ejected particles. Therefore, of the ten original particles, six were successfully extracted into the scanner probe and sent to the particle counter assembly 8 for counting. Counting six of the ten particles provides a particle efficiency PE of 60%.

FIG. 4A illustrates the same ten particles 50 disposed under the scanner probe 10 on a surface 52 to be tested. FIG. 4B illustrates the state of the surface 52 after the use of a modulated air flow supplied to the scanner probe 10 to extract and detect the particles. Of the original ten particles, only one particle remains under the scanner probe 10 as an un-extracted particle, and no particles are dislodged from the area under the scanner probe 10 as ejected particles. Therefore, of the ten original particles, nine were successfully extracted into the scanner probe and sent to the particle counter assembly 8 for counting. Counting nine of the ten particles provides a particle efficiency PE of 90%.

The modulated air flow to increase turbulence and/or air sheer acting on the particles can be provided in different ways. For example, air can be pumped into a temporary air tank and released to increase peak air flow and overcome the adhesion force of the particle on the surface so it can be removed. The air supply line to the scanner probe can be periodically shut off so only the vacuum line is drawing in the particles and avoids blowing the particles from under the probe. A piezo electric modulator in the system or in the probe face or in the air supply line of the scanner probe can be used to modulate the air flow. The modulation frequency is preferably set to avoid probe resonance and harmonics so the scanner probe 10 does not vibrate on the surface. Scanner probe oscillations can be dampened with a gasket or O-ring disposed between the probe 10 and surface under test. The pump can be turned on and off to modulate the air flow. A tank (i.e., gas reservoir) can be used to build up pressure and/or vacuum during the test or between tests, and then be used to release the pressure to increase air shear and modulation. A valve can be used to modulate the air to increase air shear and modulation.

To enhance particle extraction, the modulation frequency can be swept across a range of frequencies (e.g., from some low frequency to a higher frequency), and/or can be changed among several discrete frequencies, to address different particle sizes and materials that may be present on the test surface (i.e., for dislodging different types of particles having different resonant frequencies and/or adhesion forces). The particle counter assembly 8 additionally can include an in-line dryer or desiccant dryer to remove moisture from the air being supplied to the scanner probe 10, which can decrease the adhesion force between the particle and the surface arising from surface tension. Preferably, the connection between the particle counter assembly 8 and the scanner probe 10 conveys to the particle counter assembly 8 information about which type of scanner probe 10 is attached so the control circuitry and/or software of the particle counter assembly 8 can know the resonance frequency of the particular attached scanner probe 10 attached and being used for the surface scanning.

FIG. 5 illustrates a first embodiment of the particle counter assembly 8 for providing the modulated air flow. Particle counter assembly 8 preferably includes a connector 54 for connecting to the conduit 22 in a removable manner, so that different types of scanner probes 10 can be easily connected to the particle counter assembly 8. Air lines 56 are represented by the arrows in FIG. 5. The airstream from the scanner probe 8 passes through the connector 54 and to a particle detector 58, which can be any appropriate detector capable of detecting and counting particles in an air stream. Preferably, particle detector 58 is a laser based particle detector that is well known in the art and not further described herein. After particles in the airstream are counted, the airstream passes through a particle filter 60 to remove particles from the airstream in preparation of returning to the scanner probe. The airstream then passes through a pump 62 which creates the vacuum that draws the airstream from the scanner probe 10. The airstream passes through another filter 64 which ensures no contamination from the pump remains in the airstream. The airstream then passes through a modulator 66 that modulates the rate of flow (i.e., amplitude) of the airstream. Modulator 66 could simply be a valve or piezoelectric membrane that modulates the airstream headed back to the scanner probe 10. The modulator can be configured to divert some or all of the airstream to an exhaust port 68 so that the airstream returning to the scanner probe can be operated independently from the vacuum drawing airflow from the scanner probe 10 (i.e., the second airstream headed to the scanner probe can be operated independently from the first airstream headed to the particle counter assembly). For example, at the beginning of the particle counting operation, only a vacuum may be applied to the scanner probe so that no loosely bound particles will be ejected, then later in the particle counting operation the airstream is then applied to the scanner probe to remove particles more tightly adhered to the test surface. The exhaust port 68 could include another air filter to prevent any return contamination to the environment. Before returning to the connector 54 and to the scanner probe 10, the airstream can pass through an optional dryer 69 that removes moisture from the airstream to decrease the adhesive force of particles to the surface.

Figure 6:
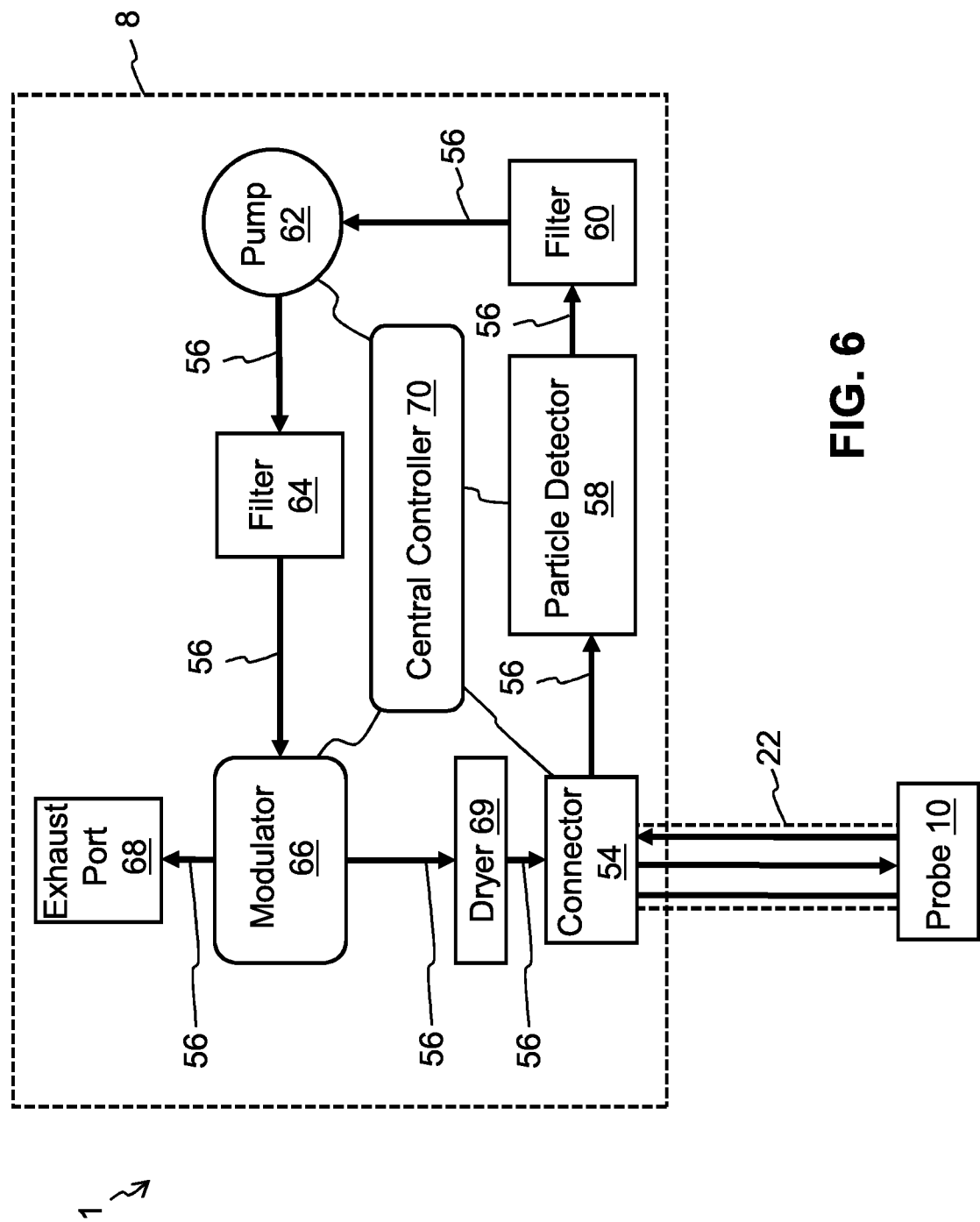
FIG. 6 is a block schematic diagram of the particle counter assembly and the scanner probe.

The control circuitry for operating the particle detector 1 can be dispersed among the components, where the various components communicate with each other during operation so that there is coordinated operation (see FIG. 5). Alternately, there can be a central controller containing most or all the control circuitry for controlling the operation of the various components in a coordinated fashion, as illustrated in FIG. 6.

Figure 7:
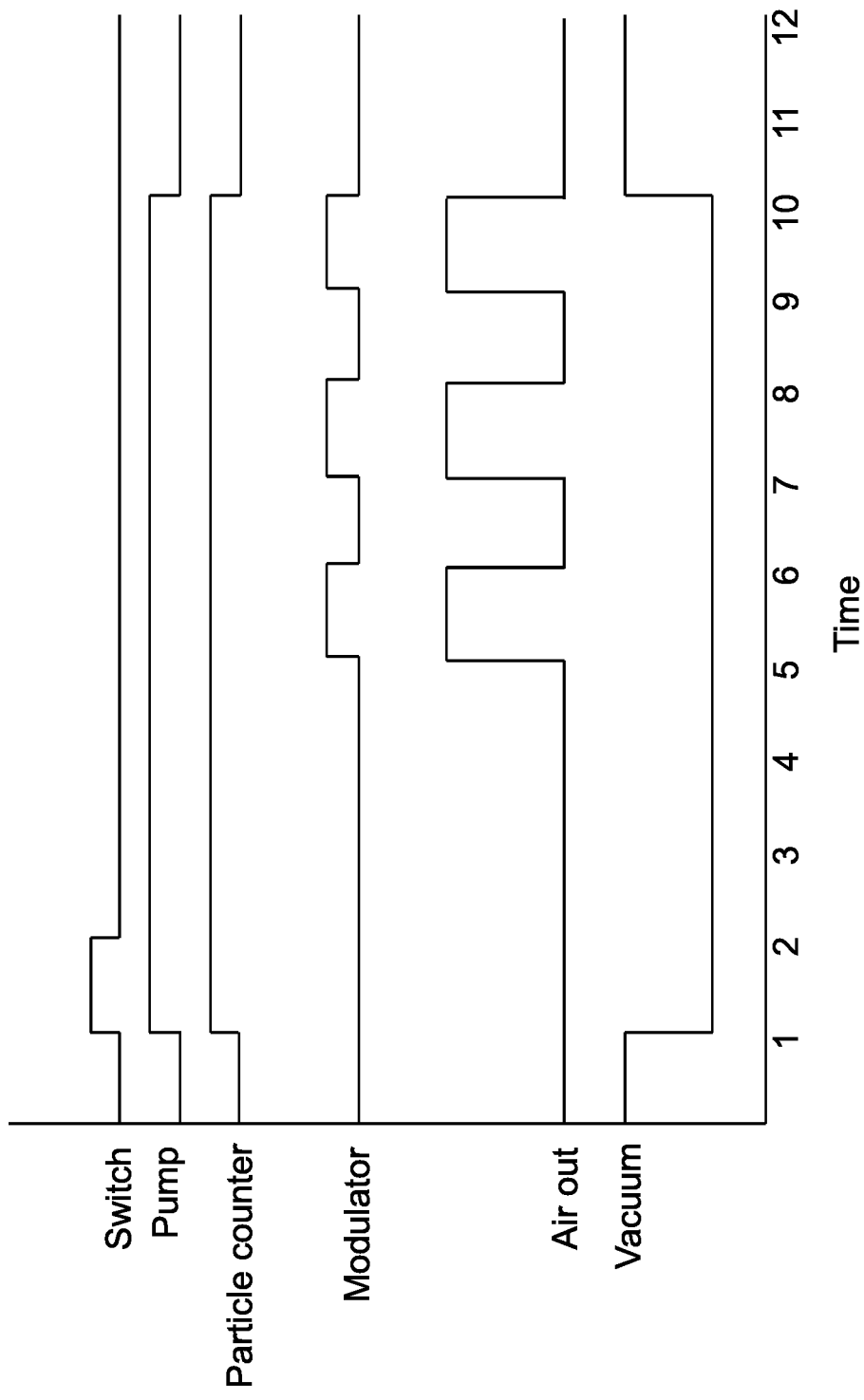
FIG. 7 is a timing diagram for the operation of the particle detector.

FIG. 7 is a timing diagram showing the particle counting operation of the particle detector 1. At time=1, the user actives the run switch 20 (which could be a press button), which activates the particle detector 58 and activates the pump 62 to generate a vacuum that draws air from the scanner probe 10 and to the particle detector 58. During this initial time period (e.g., time=1 to time=5), the modulator 66 is not activated to supply air back to the scanner probe 10 (i.e., there is no airstream out to the scanner probe 10, the airstream is instead diverted to the exhaust port 68). During this time, the vacuum will draw air from the environment and between the test surface and the bottom side 14 of the scanner probe, whereby this airstream will dislodge and capture low adhesion particles that will travel with the airstream caused by the vacuum through the scanner probe 10, conduit 22 and to the particle detector 58. At a later time (e.g., time=5), the modulator 66 is activated to modulate the amplitude of the airstream returning to the scanner probe 10 (i.e., create amplitude pulses of the airstream). As indicated in the diagram of FIG. 7, the amplitude of the airstream going out to the scanner probe 10 oscillates between high peak values and low or zero values at a certain frequency. This modulated airstream results in modulated air velocities at the bottom side 14 of the scanner probe 10 that at peak amplitude values will dislodge and capture high adhesion particles that will travel with the airstream into scanner probe 10, through conduit 22 and to the particle detector 58. After a predetermined amount of time or number of oscillations/pulses, the pump, particle counter assembly and modulator are deactivated (e.g., at time=10), whereby the airstreams to and from the scanner probe 10 ceases. It should be noted that while FIG. 7 shows only three pulses of the airstream going out to the scanner probe 10, there can be dozens, hundreds or more of these pulses used in a single particle counting operation.

While the modulation frequency shown in FIG. 7 is fixed over the duration of the particle counting operation, the modulation frequency can be varied during the particle counting operation. For example, the modulation frequency can continuously sweep over a range of modulation frequencies during a single particle counting operation. Or, the modulation frequency can step or change between predetermined frequency modulation values during a single particle counting operation. Or, multiple particle counting operations can be performed each using a different modulation frequency.

Figure 8:
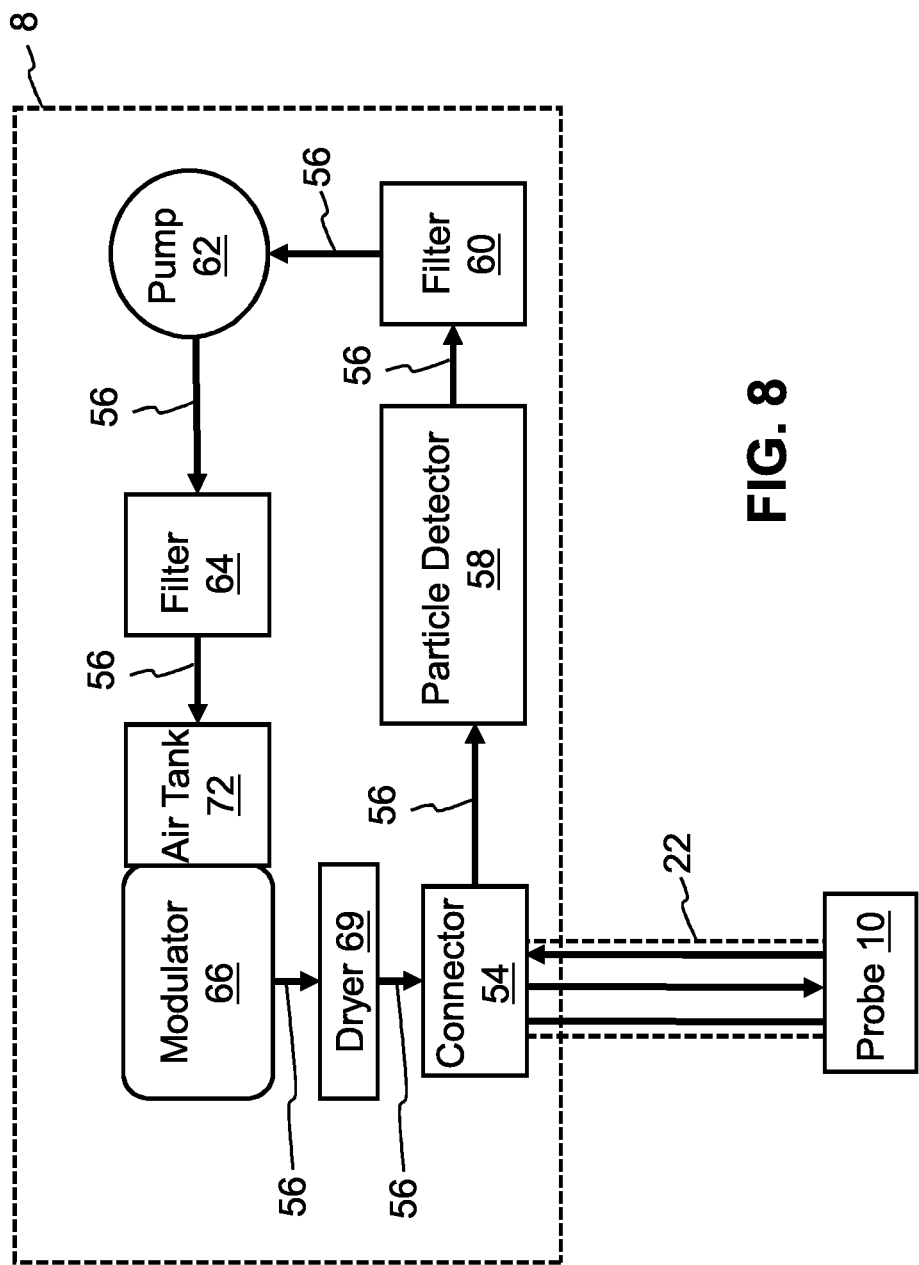
FIG. 8 is a block schematic diagram of the particle counter assembly and the scanner probe.
Figure 9:
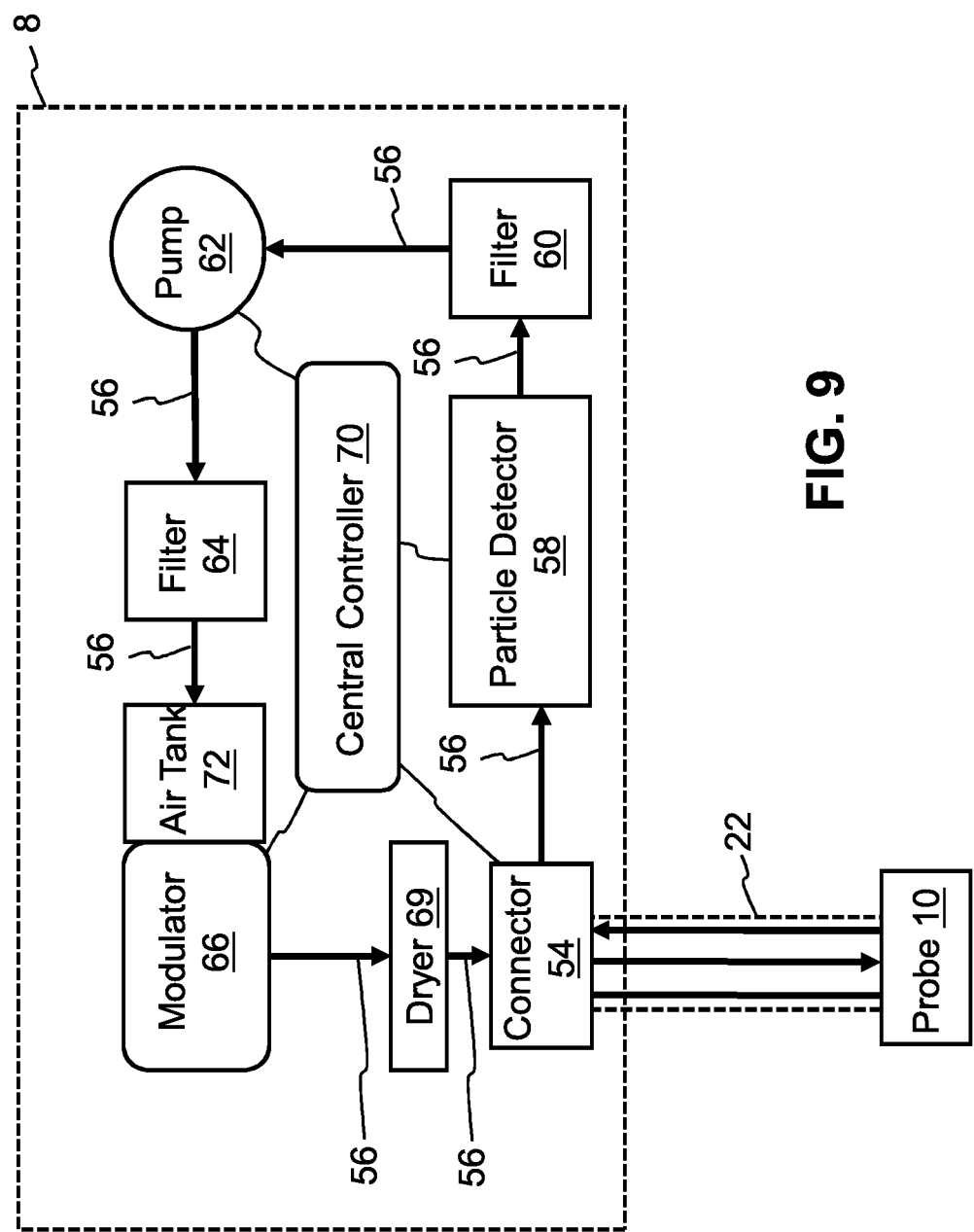
FIG. 9 is a block schematic diagram of the particle counter assembly and the scanner probe.

FIG. 8 illustrates an alternate embodiment of the particle counter assembly 8 for providing the modulated air flow. The modulator 66 includes an air tank 72 in which air pressure builds before and between airstream pulses to the scanner probe 10. The pressurized air in tank 72 is released by modulator 66 to create the pulses of modulated airstream to the scanner probe 10. FIG. 9 shows the same configuration, except with centralized control circuitry in the form of a central controller 70.

Figure 10:
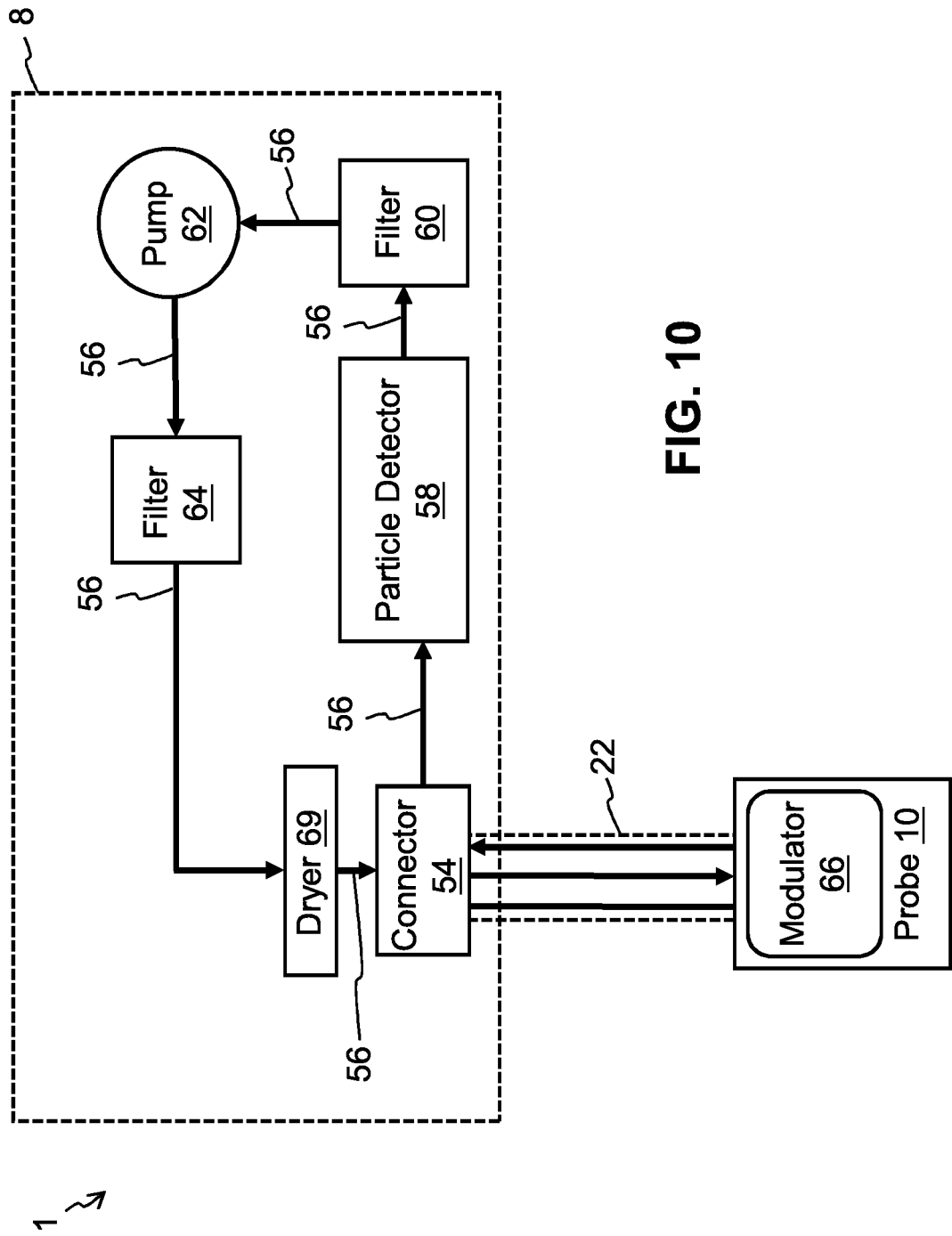
FIG. 10 is a block schematic diagram of the particle counter assembly and the scanner probe.
Figure 11:
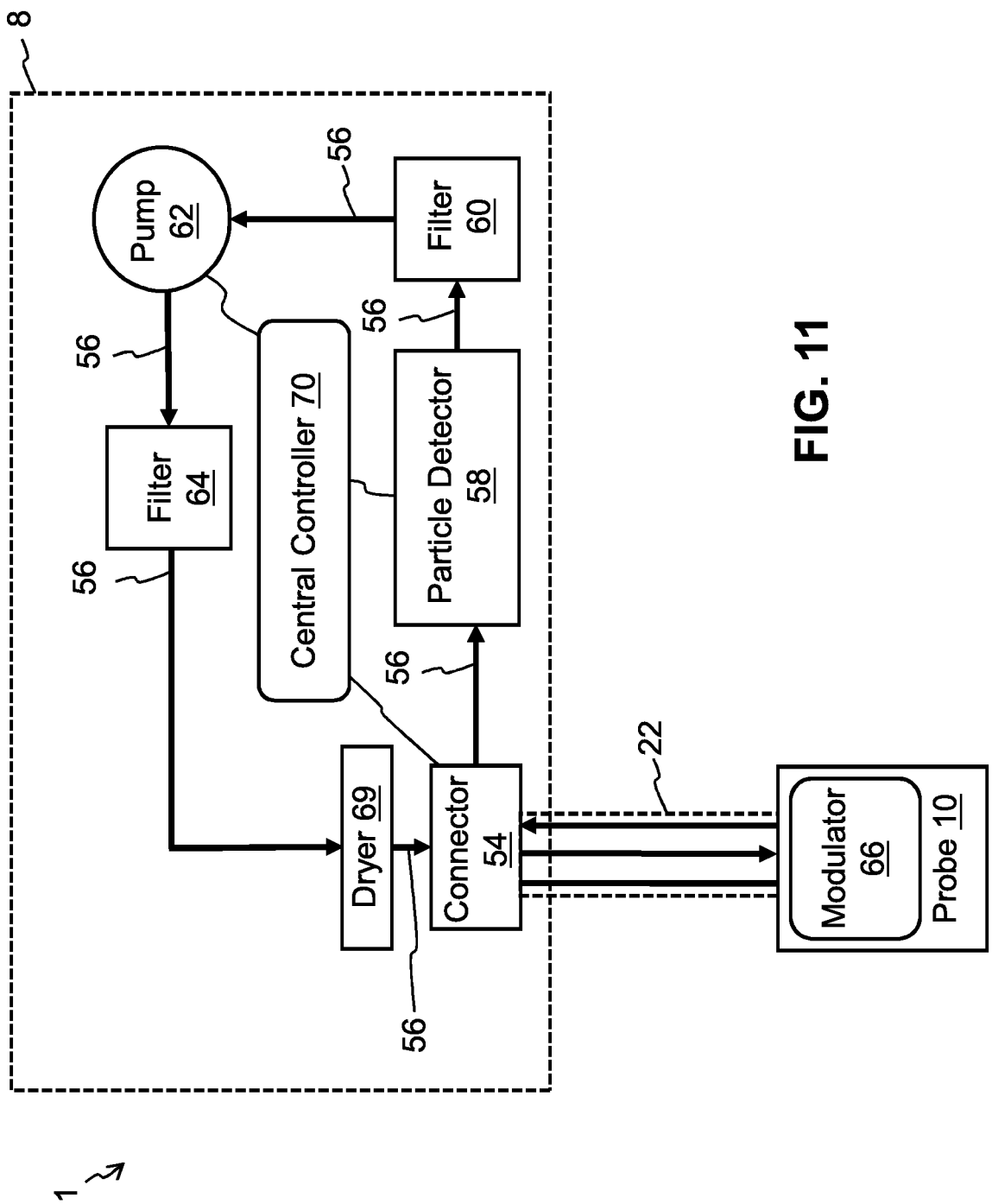
FIG. 11 is a block schematic diagram of the particle counter assembly and the scanner probe.

FIG. 10 illustrates another alternate embodiment, where the air modulator 66 is configured as part of the scanner probe 10 instead of the particle counter assembly 8. By locating the modulator 66 inside of the scanner probe 10 and close to bottom side 14 of the base 12, dampening of the air flow modulation or peak air shear that might occur between the particle counter assembly 8 and the scanner probe 10 can be avoided. FIG. 11 shows the same configuration, except with centralized control circuitry in the form of a central controller 70.

Figure 12:
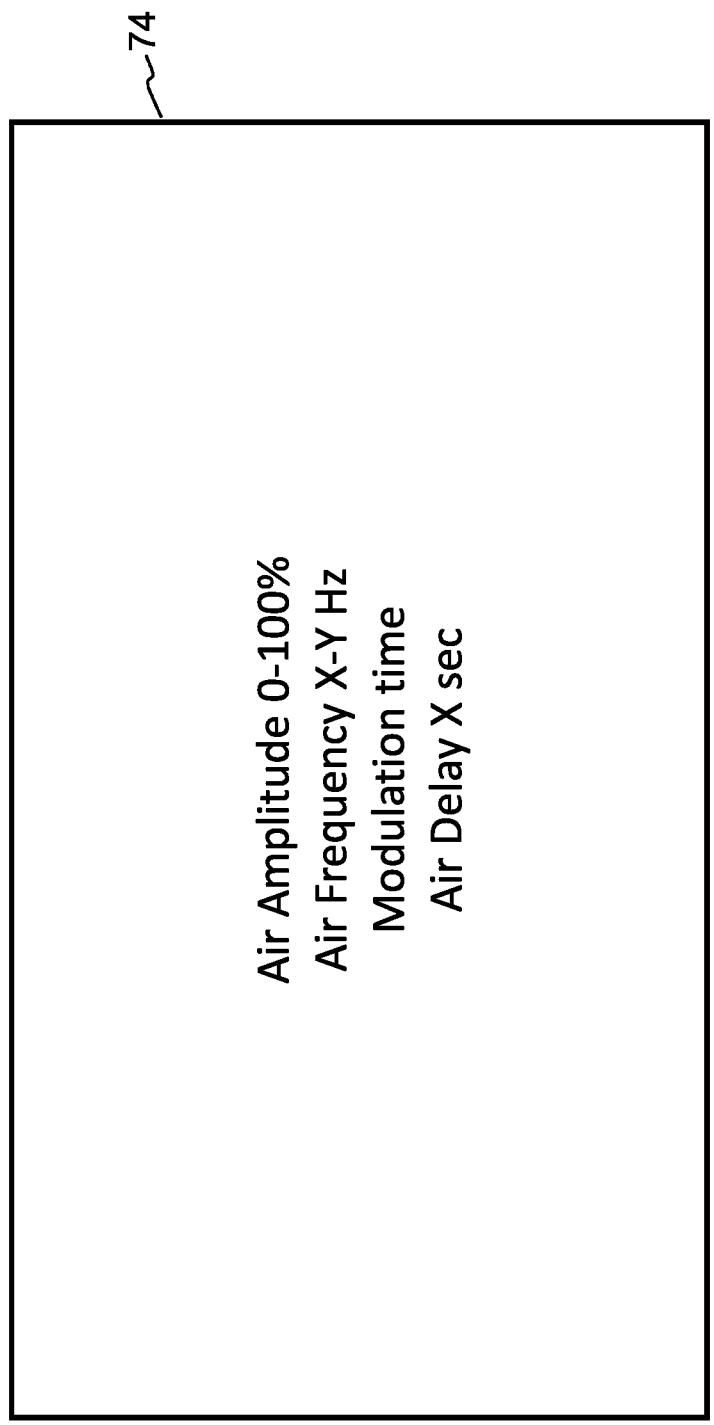
FIG. 12 is an illustration of the user interface screen of the particle detector.
Figure 13:
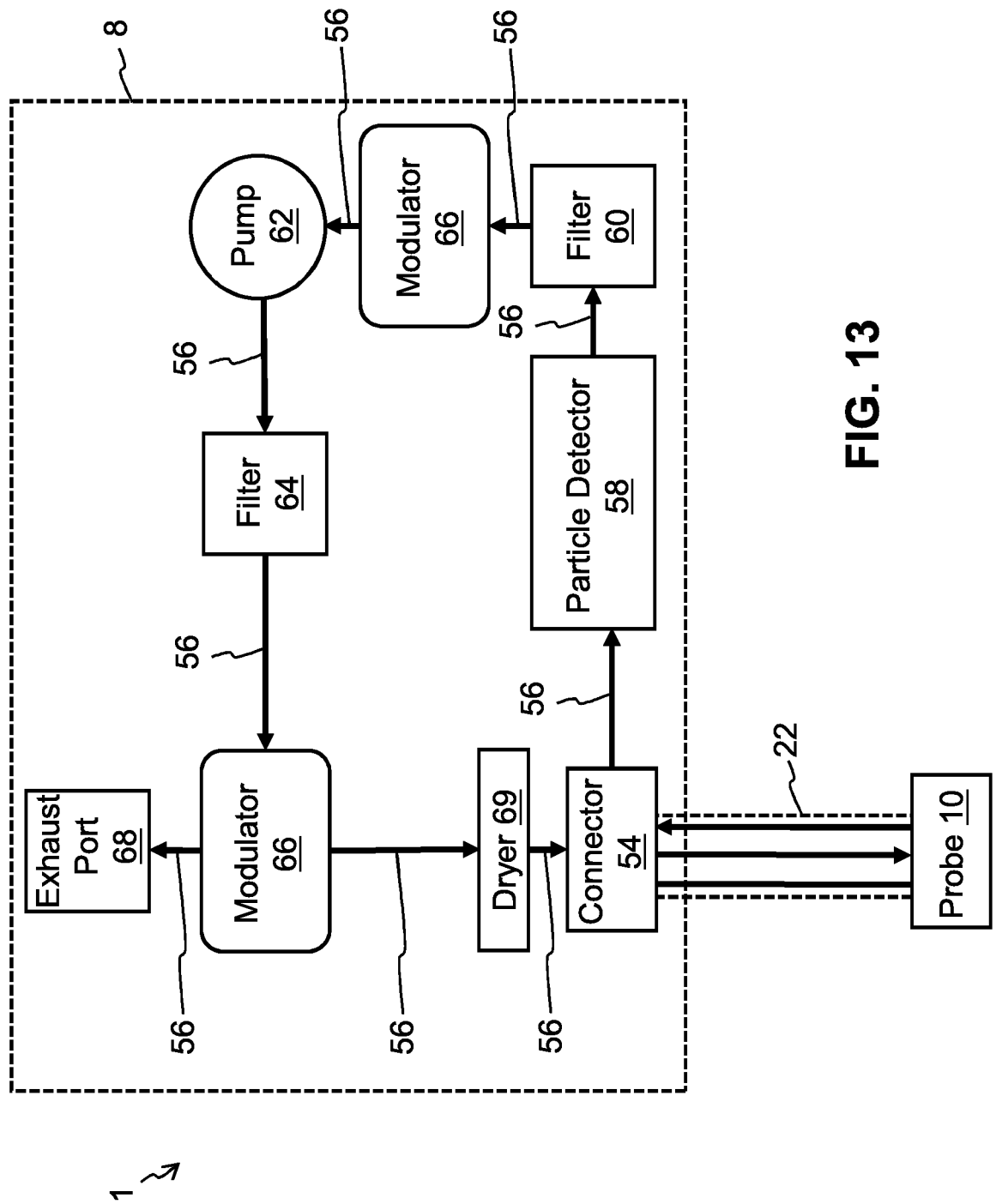
FIG. 13 is a block schematic diagram of the particle counter assembly and the scanner probe.

FIG. 12 illustrates a user interface screen 74 that can be part of the particle counter assembly 8 or scanner probe 10, and allows the user to set the airstream amplitude, modulation frequency, modulation time, and the delay between the start of the vacuum/detection and the beginning of the modulated airstream to the scanner probe 10. These parameters can be set or changed automatically upon detecting the type of scanner probe that is connected to the connector 54.

The above described operation involves modulating the amplitude of the airstream to the scanner probe 10. However, the airstream from the scanner probe 10 to the particle counter assembly 8 (caused by the vacuum from pump 62) can instead or additionally be modulated. Specifically, the air flow modulation across the scanned surface can be achieved by modulating the airstream to the scanner probe 10 and/or modulating the airstream from the scanner probe 10. If both the airstreams to and from the scanner probe 10 are modulated, they can be modulated in phase with each other, or out of phase with each other, to maximize Particle Efficiency. Modulating the airstream from the scanner probe 10 can be implemented by modulating the operation of pump 62, using the existing modulator 66 in the probe head, or including a separate modulator 66 for the airstream from the scanner probe 10 as shown in FIGS. 13 and 14.

It is to be understood that the present invention is not limited to the embodiment(s) described above and illustrated herein, but encompasses any and all variations falling within the scope of any claims. For example, references to the present invention herein are not intended to limit the scope of any claim or claim term, but instead merely make reference to one or more features that may be covered by one or more claims. Materials, processes and numerical examples described above are exemplary only, and should not be deemed to limit the claims. The particle counter assembly and the scanner probe could be combined into a single housing, thus omitting conduit 22. A single hole 44 could be used instead of multiple holes 44. The two modulators 66 in FIGS. 13 and 14 could be combined into a single device.

What is claimed is:

1. A device for counting particles on a sample surface, comprising:
- a scanner probe having a first opening for receiving particles from the sample surface and one or more second openings;
- a particle detector for detecting particles passed there-through;
- a modulator for modulating air flowing there-through;
- a pump for producing a first airstream flowing from the first opening and through the particle detector, and for producing a second airstream flowing through the modulator and to the one or more second openings;
- a control circuitry for controlling the modulator to modulate an amplitude of the second airstream; and
- wherein the amplitude of the second airstream is modulated as a series of pulses having a frequency that varies over time.

2. The device of claim 1, wherein the amplitude of the second airstream is modulated as a series of pulses having a frequency that sweeps over a range of frequencies over time.

3. The device of claim 1, wherein the first and second airstreams are produced during first and second time periods, and wherein the modulator blocks the second airstream from reaching the one or more second openings during the first time period and enables the second airstream to reach the one or more second openings during the second time period which is after the first time period.

4. The device of claim 1, wherein the particle detector and the pump are disposed in a particle counter assembly, and wherein the device further comprises:
- a conduit having a first end connected to the scanner probe and a second end connected to the particle counter assembly, wherein the conduit includes first and second tubes, and wherein the first airstream flows through the first tube and the second airstream flows through the second tube.

5. The device of claim 4, wherein the modulator is disposed in the particle counter assembly.

6. The device of claim 4, wherein the modulator is disposed in the scanner probe.

7. The device of claim 1, wherein the modulator and the control circuitry are configured to modulate an amplitude of the first airstream.

8. The device of claim 7, wherein the amplitude of the first airstream is modulated as a series of pulses having a fixed frequency.

9. The device of claim 7, wherein the amplitude of the first airstream is modulated as a series of pulses having a frequency that varies over time.

10. The device of claim 7, wherein the amplitude of the first airstream is modulated as a series of pulses having a frequency that sweeps over a range of frequencies over time.

11. The device of claim 1, wherein all of the control circuitry is disposed in a central controller connected to the particle detector, the modulator and the pump.

12. The device of claim 1, further comprising:
- an air tank for accumulating pressurized air, wherein the modulator is configured to use the pressurized air to modulate the second airstream.

13. The device of claim 1, further comprising:
- a filter for removing particles from the first airstream.

14. The device of claim 1, further comprising:
- a filter for removing particles from the second airstream.

15. The device of claim 1, further comprising:
- a dryer device for removing moisture from the second airstream.

16. The device of claim 1, further comprising:
- a second modulator for modulating air flowing there-through, wherein the first airstream passes through the second modulator, and wherein the control circuitry is configured to control the second modulator to modulate an amplitude of the first airstream.

17. A device for counting particles on a sample surface, comprising:
- a scanner probe having a first opening for receiving particles from the sample surface and one or more second openings;
- a particle detector for detecting particles passed there-through;
- a modulator for modulating air flowing there-through;
- a pump for producing a first airstream flowing from the first opening and through the particle detector and through the modulator, and for producing a second airstream flowing to the one or more second openings;
- a control circuitry for controlling the modulator to modulate an amplitude of the first airstream;
- a second modulator for modulating air flowing there-through, wherein the second airstream passes through the second modulator, and wherein the control circuitry is configured to control the second modulator to modulate an amplitude of the second airstream; and
- wherein the amplitude of the second airstream is modulated as a series of pulses having a frequency that varies over time.

* * * * *